United States Patent [19]

Desor

[11] 4,096,759
[45] Jun. 27, 1978

[54] PRESSURE GAUGE FOR INDICATING SMALL PRESSURE CHANGES

[75] Inventor: Gerhard Desor, Bad Homburg, Germany

[73] Assignee: Hauser Verwaltungs-Gesellschaft mit beschrankter Haftung, Oberursel, Germany

[21] Appl. No.: 775,351

[22] Filed: Mar. 7, 1977

[30] Foreign Application Priority Data

Mar. 10, 1976 Germany .............................. 2609882

[51] Int. Cl.² .............................................. G01L 7/00
[52] U.S. Cl. ................................. 73/731; 116/114 PV
[58] Field of Search ........................... 73/409, 410; 116/114 PV, 406

[56] References Cited

U.S. PATENT DOCUMENTS 2,252,874  8/1941  Vischer, Jr. ........................... 73/409
3,376,750  4/1968  Ekstrom, Jr. ......................... 73/409
3,745,823  7/1973  Hunter .................................. 73/410

FOREIGN PATENT DOCUMENTS 1,193,600  6/1970  United Kingdom .................. 73/409

Primary Examiner—Donald O. Woodiel
Attorney, Agent, or Firm—Burgess, Dinklage & Sprung

[57] ABSTRACT

A pressure gauge for indicating small pressure changes includes a sac of thin flexible film material communicable with and inflatable by the pressure to be indicated, during use. The sac is supported by a base so that the sac effectively inflates in a generally vertical direction, during use. A transmission plate is pivotally mounted to the base and bears against the sac under the influence of its own weight. A pointer is directly connected to the transmission plate to indicate the position thereof under the influence of pressure in the sac to effect the indication of that pressure.

16 Claims, 5 Drawing Figures

PRESSURE GAUGE FOR INDICATING SMALL PRESSURE CHANGES

BACKGROUND

The invention relates to a pressure gauge for indicating small pressure changes, comprising a sac of a thin flexible film material adapted to be inflated by the pressure to be indicated, the sac being interposed between a base and a movable transmission plate associated with a pointer.

An instrument of this type, which has been described for use as a liquid level gauge in British patent specification No. 1,193,600, is intended to respond to particularly small pressure changes for example within a pressure range of measurement from 10 to 40mm of water. The measurement is performed by immersing the end of a pipe connected to the sac into the liquid whose level it is desired to measure, and then slightly raising the pressure inside the immersed pipe for instance with the aid of a small hand pump. The rise in pressure will cease abruptly when gas begins to escape from the end of the pipe into the liquid. This pressure, with due reference to the specific gravity of the liquid, is a measure of the depth the open end of the pipe is immersed in the liquid.

An application of such pressure gauges is that of indicating liquid level, in particular the level of oil in the sump of a motor vehicle engine. This application requires reliable readings to be given of differences in oil level between 10 and 40mm. It is a nuisance to have to open the vehicle bonnet each time the oil level is to be checked, and to have to do this in the usual way with a dipstick which must first be wiped clean. The transference of the point of the indication to the dashboard and the elimination of the need for awkward and dirty manipulations in the engine compartment has often been described as a desirable aim. However, on the one hand, such an indicating instrument would be required to give a precise and reliable reading throughout an extended service life because the proper maintenance and safety of the engine would greatly depend upon its readings and, on the other hand, the instrument would have to be inexpensive and simple to manufacture in view of the large numbers that would be required.

The known instrument satisfies requirements to some extent. It contains a cushion-shaped sac consisting of two squares of very thin highly flexible non-elastic synthetic plastics film seamed together around their peripheries to create a gastight joint. Plastics film materials which meet this specification are on the market. For instance, a very thin polyethylene film can be used. The seam produced by hot sealing around the periphery of the cushion determines the direction in which the flattened sac will expand when inflated. The cushion expands in a direction normal to a plane containing the peripheral seam and during inflation the distance between parts of the seam on opposite sides of the sac contracts. Only slight gas pressure is sufficient for inflation.

In the known type of instrument the cushion-shaped sac is so positioned that the principal plane containing the hot sealed seam is vertical when the instrument has been installed, so that the sac will expand horizontally when inflated. The transmission of the sac expansion to a pointer or to a pointer actuating linkage is effected through a member in the form of an elbow lever and a transmission plate which is firmly attached to the sac and against which the lever bears. The plate also functions as a reinforcement for stiffening the film. The pointer or its associated lever system is loaded by a special restoring spring which with regard to its spring rate and its point of action on the elbow lever and with regard to its bias and position in relation to the sac must be preset by two adjustments having independent effects. The necessity of having to provide a transmission member in the form of an elbow lever and a restoring spring greatly augments the complications and expense of manufacture and assembly, beside adding to the overall bulk and size of the instrument. The firm connection of the flat stiffening plate to the sac limits the linear expandability of the sac and hinders its inflation. Moreover, the necessity of having to make two different adjustments causes additional work involving further checks by inspection. It is for these reasons that the known instrument has failed to become as popular as might have been expected.

SUMMARY

The present invention seeks to provide an improved instrument. Such improvement is sought by so disposing the base, the transmission plate and the sac that, in the installed instrument, the effective direction of expansion of the sac is substantially vertically upwards, and by directly connecting the pointer to the transmission plate.

According to the invention there is provided a pressure gauge for indicating small pressure changes comprising a sac of thin flexible film material adapted to be inflated by the pressure to be indicated, a base for supporting the sac, a transmission plate which, in use, bears under the influence of its own weight against the sac, and a pointer fixed to the transmission plate to indicate the position thereof under the influence of pressure in the sac.

As a result of the disposition of the sac, the base and the transmission plate, the restoration of the pointer to zero is effected by gravity as soon as the gas pressure which had caused the deflection of the pointer falls. Owing to the great flexibility of the sac the weight of the transmission plate resting on the sac is sufficient for this purpose, although the plate may consist of an extremely thin piece of sheet metal. However, a supplementary weight may be mounted on the transmission plate, which would then function to change the measuring range as might be desired. The provision of a restoring spring is in principle unnecessary although a supplementary spring may be fitted, for instance for the purpose of changing the measuring range and/or the linearity of the reading. The direct transmission of the deflection of the transmission plate to the pointer eliminates all intermediate components and the frictional forces which would then arise. It should be borne in mind that generally linear motions are converted to rotary motions and that relative movement occurs at points of contact when the deflection radii are finite.

Preferably a cushion-shaped sac — constructed from two rectangular pieces of film, superposed and seamed at their peripheral edges — is provided. Thus to achieve substantially vertical expansion with such a sac, the peripheral seam of the cushion and/or the principal plane containing the seam is substantially horizontal so that the wall panels of the cushion when inflated are relatively displaced upwards and downwards. The uninflated area of the cushion-shaped sac is conveniently at least as large as the area of the base and of the transmission plate so that the sac when collapsed and containing no pressure will assume the shape of a flat rectangular sandwiched between facing elements.

However, the invention is not intended to be limited in scope to the use of a cushion-shaped sac, and it also is not of the essence to use a material that will not stretch. There would be no objection to the interposition between the base and the transmission plate of for instance a tubular or cylindrical sac or even a spherical sac. The co-operation of such a sac with the base and the transmission plate will again be such that the effective direction of expansion of the inflating sac is substantially vertically upwards. The expansion of the sac will be assisted if, according to another feature of the invention, the plate rests freely on the surface of the sac, and particularly if the plate is not bonded to the sac so that the material of the sac can locally slide over and lift away from the transmission plate. Though it is possible for the sac to be partially attached to the transmission plate, or even attached over the entire surface of the transmission plate.

When use is made of a cushion-shaped sac this can be inflated until — disregarding the corners which then forms ears — the entire sac assumes a spherical shape.

In a particularly useful embodiment of the invention the area of the transmission plate may be less than the uninflated area circumscribed by the sac and one of the edges of the plate may co-operate with a plate attached to the base in the manner of a hinge which permits the transmission plate to swing up and down about a horizontal symmetry plane containing the hinge. These features provide precise control of the movement of the transmission plate, such as will provide a well defined and reproducible reading within narrow limits of of tolerance, without special adjustments having to be made. The deflection range will roughly correspond to the measuring range of the pressure gauge, the transmission plate being roughly horizontal in the middle of the measuring range.

The hinge may itself be contrived in various ways. A particularly simple though reliable type of hinge is formed by a slot in the above-mentioned plate and by an extension of the transmission plate which extends roughly at right angles through the slot. This form of construction creates a kind of knife edge bearing, assuming naturally that the width of the slot exceeds the thickness of the transmission plate by a sufficient margin to provide for unrestricted movement of the plate about the bottom edge of the slot. Lugs produced by slotting the edges of the transmission plate may be arranged to engage the back of the slotted part of the casing and to prevent the transmission plate from accidentally slipping out of the slot. Nevertheless, if desired, a conventional hinge could be formed by connecting cooperating upright lugs with a hinge pin passing through the holes in the lugs.

The pointer may be connected to the plate in any desired way, always provided there are no independently movable intermediate members. In a preferred arrangement the transmission plate may be so contrived that the pointer consists of an integral extension projecting from the side of the transmission plate remote from the hinge.

In order to provide a substantially linear reading the deflection range of the transmission plate should preferably be arranged to be equiangular on either side of a given center line. According to the invention this may be achieved by inclining the upper surface of the base in relation to the horizontal, the angle of inclination being roughly equal to the full downward deflection of the pointer from the symmetry plane dividing the full angular range of the transmission plate into two equal halves. Preferably the angle of inclination is between 15° and 30° but, depending upon the shape of the sac, it might also be more.

In a particularly useful form of construction, the pressure gauge embodies a vertical edgeview projecting dial facing the person taking the reading, the axis of curvature of the dial roughly coinciding with the axis of the hinge and the pointer projecting through a vertical slot extending parallel to one side of the dial. The pointer has an indicating portion extending across the dial parallel to the division lines of the graduated scale on the dial. This is a design that provides a pressure gauge of very narrow rectangular box shape which, can be mounted in a pressure gauge panel without occupying more than a minimum of space. The width of such a pressure gauge is determined exclusively by the minimum necessary width of its mechanical parts.

However, practical embodiments of the invention are not confined to edgeview types of such a kind. The dial may also be of the flat arcuate sector type, the sector having a horizontal symmetry axis coincident with the axis of the hinge. Such an arrangement is particularly suitable for a cluster with other gauges and controls on the dashboard of a motor vehicle.

Alternatively, and without abandoning any of the general advantages afforded by the invention the pressure gauge may be provided with a sector type dial wherein the dial sector has a vertical symmetry axis coinciding with the halfway position of the pointer on the scale. This can be achieved if the pointer is an upward off-angled extension of the transmission plate and springs from a point near the hinge, the sector type dial being located above the hinge.

The proportionality or linearity of the reading may be modified by convexly bending the transmission plate so that a convex face thereof rests on the sac. In such a case the transmission plate may be substantially cylindrical with a central axis which is parallel to that of the hinge of the transmission plate. In such a case the contacting surface area is to be arranged to decrease when the transmission plate is hingeably lifted so that a correspondingly higher internal pressure is needed to produce a given deflection. The consequence is a degressive functional relationship between the scale reading and the measured quantity, and the linearity of the reading can thus be modified.

DESCRIPTION OF THE DRAWING

In order that the invention may be more readily understood, embodiments thereof will now be described with reference to the accompanying drawings in which.

DESCRIPTION

Figure 1:
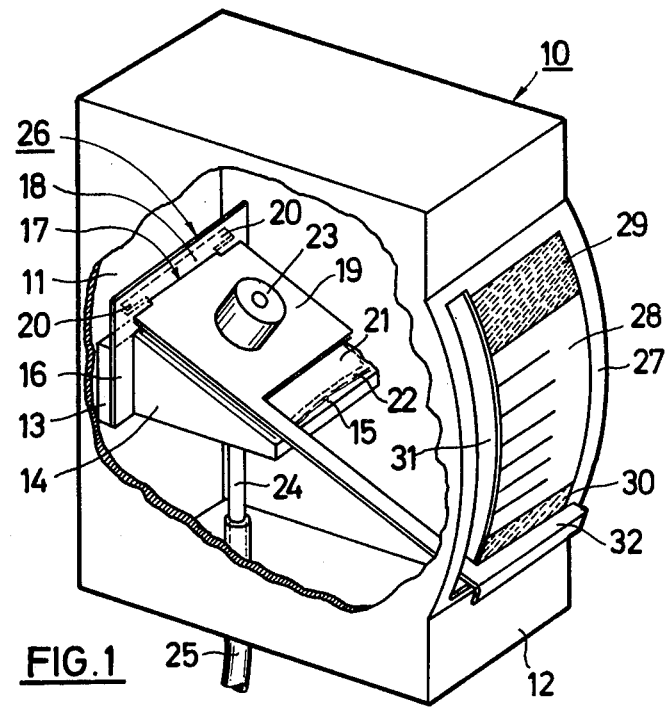
FIG. 1 is a perspective view of a vertical edgeview projecting dial pressure gauge according to the invention showing part of the side wall broken away to reveal the inflatable sac completely collapsed.

With reference to FIG. 1, the illustrated pressure gauge is of the vertically indicating edgeview projecting dial type mounted in a box-shaped casing 10. The casing comprises a rear wall 11, a front wall 12, and side walls not identified by special references. Attached to the rear wall 11 with the interposition of a spacing member 13 is a base 14 in the form of a block having an upper surface sloping downwards from the horizontal. Interposed between the spacing member 13 is a base 14 in the form of a block having an upper surface sloping downwards from the horizontal. Interposed between the spacing member 13 and the base block 14 is a backing plate 15 which extends parallel to the rear wall 11 and consists of a thin metal sheet slightly larger than the abutting side face of the base block 14, and provided with a horizontal slot 17 just above the upper edge of the surface 15 of the block. An extension 18 of a transmission plate 19 passes through this slot and, since it is not directly visible in the figure, its presence is indicated by a dotted line. The transmission plate 19 also consists of a thin sheet metal plate and the extension 18 is formed at the back of part 16 with projecting lugs 20 produced by slots having been punched into the edges of the transmission plate. These lugs prevent the extension 18 from being pulled out through the slot in the backing plate 16.

Interposed between the base block 14 and the transmission plate 19 is a sac 21 which consists of two flat rectangular pieces of film joined together at their peripheries by a tightly sealing seam 22 and thus forming an inflatable sac resembling a cushion. In FIG. 1 the sac 21 is shown completely collapsed so that the two pieces of film lie flat the one on the other. In this position the surface 15 of the base block 14 and the transmission plate 19 are parallel and separated only by the thickness of the two films forming the sac 21. The transmission plate is in its bottom position in FIG. 1. The transmission plate carries a weight 23 which by its magnitude determines the measuring range of the instrument.

A small tube 24 communicates with the space enclosed between the two films of the sac 21 and passes through the base block 14 in which it is fixed. The tube 24 is itself connected to a flexible pipe 25 which may lead for instance to a hollow open-ended dipstick not shown. A low pressure generated in this pipe 25, for instance by a small air pump, can be transferred into the interior of the sac 21.

The front wall 12 of the casing 10 arches convexly outwards and includes the surface 27 of a cylindrical dial with a central axis coinciding with the axis of the hinge 26 formed by the cooperation of the two parts 16 and 19 in the slot 17. The edge sector surface 27 carries a scale 28 in the form of a conventional numbered graduation possibly provided with colored terminal bands 29 and 30. On one side of the scale 28 and parallel thereto there is a vertical slot 31 through which a pointer 32 projects from the interior of the casing. The pointer is formed by an extension of the transmission plate 19 projecting from the edge remote from the hinge 26, and outside the slot this pointer has an indicating portion extending at right angles to the stem of the pointer across the scale parallel to the lines of the graduation. The base block 14 and the transmission plate 19 are so located and the length and shape of the pointer 32 are so chosen that in conjunction with the other features of the general configuration which have already been described the pointer 32 will be at the bottom of the scale when it is in its lowest position as illustrated in FIG. 1.

Figure 2:
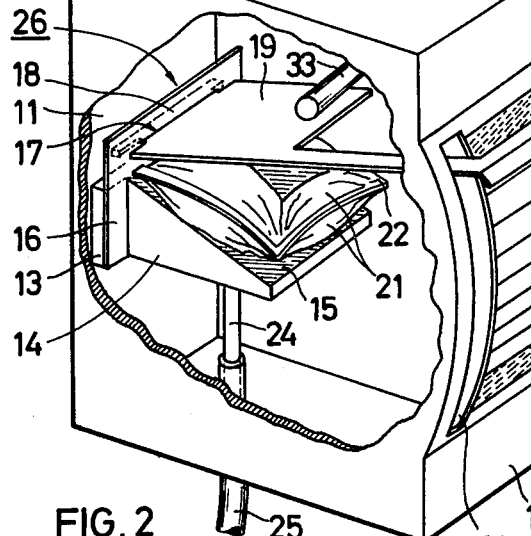
FIG. 2 is a similar view to that in FIG. 1, showing the sac fully inflated.

If now the pressure inside the flexible pipe 25 and inside the sac 21 is gradually raised, the sac will inflate at a proportional rate and lift the transmission plate 19 about its hinge 26, until finally it reaches the end position shown in FIG. 2. It will be understood from FIG. 2 that in this position the sac 21 has expanded nearly to the shape of an inflated balloon. The direction in which the sac expands in relation to the transmission plate 19 when the pressure gauge stands upright for use, as in the drawing, will be seen to be substantially vertical. Moreover, it will also be understood from this drawing that the cushion-shape of the sac could be replaced by the above-described alternative shapes as these would also expand in an upward direction towards the transmission plate.

The end position illustrated in FIGS. 1 and 2 define a deflection range of the transmission plate 19 and of the pointer 32, which is roughly symmetrical upwards and downwards about a horizontal plane. The angle of inclination of the surface 15 of the base block 14 in relation to this horizontal plane corresponds to half the deflection range of the pointer 32. A limit stop 33 may be fitted inside the casing 10 to intercept the transmission plate 19 when it reaches the end position shown in FIG. 2.

Figure 3:
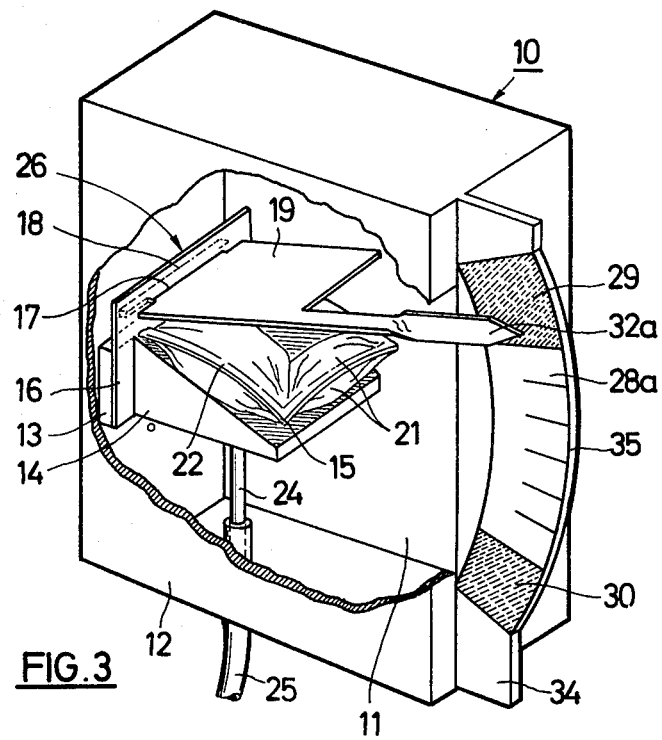
FIG. 3 shows a pressure gauge which is a modification of the pressure gauge of FIGS. 1 and 2 provided with a flat sector dial on the side of the pressure gauge casing.

In FIG. 3 parts corresponding to like parts in FIGS. 1 and 2 bear the same reference numbers and their description need not be repeated. The front wall 12 of the casing 10 in this embodiment is flat instead of convex and the casing 10 has a lateral extension 34 forming an arcuate sector-type dial 35 which bears a scale 28a. The end of the pointer 32a projecting from the casing 10 includes a 90° axial twist to bring its end parallel with the plane of the scale 28a. Otherwise this embodiment agrees functionally in every respect with the embodiment illustrated in FIGS. 1 and 2.

Figure 4:
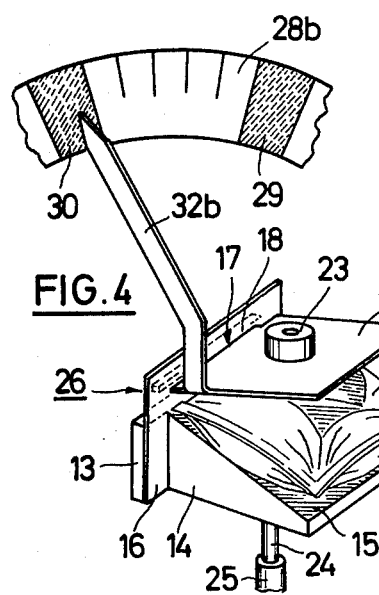
FIG. 4 shows a modification of the pressure gauge of FIG. 3 provided with a flat sector type dial disposed at the top of the gauge.

FIG. 4 merely reproduces the movement of the instruments in FIGS. 1 to 3, comprising the parts numbered 14 to 25. The only difference is the shape of the pointer 32b which is bent upwards from a point on the transmission plate close to the hinge 26, and is then off-angled at a point intermediate its ends by an acute angle to the left to provide symmetrical zero and fully deflected positions. The associated scale 28b is located above the hinge 26 in such a way that the bisector of the arcuate sector forming the dial is vertical and contains the axis of the hinge 26.

Figure 5:
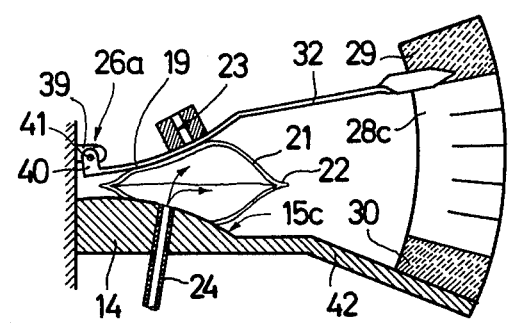
FIG. 5 is a cross-section of a pressure gauge incorporating a curved transmission plate.

FIG. 5 illustrates another embodiment of the movement of the pressure gauge, the reference numbers of parts corresponding to parts that have already been described being unchanged. It will be seen how the little tube 24 passes through the base block 14 and enters the interior of the sac through the bottom film. In this arrangement the transmission plate 19 is convexly arched facing the sac and the upper surface 15c of the base block 14 is correspondingly convexly arched. As a result of this configuration of the co-operating parts the area of the contacting surfaces of the sac 21 and the transmission plate 19 become smaller as the sac progressively inflates, and this gives rise to a degressive characteristic of the reading. The construction of the hinge 26a also differs from the previously described design, in so far as the hinge is formed by two fixed lugs 39 and two cooperating lugs 40 at the end of the transmission plate 19, and a hinge pin 41 for joining the two pairs of lugs together. The sac 21 here, as in the previous examples, is located as close as possible to the hinge, and part thereof may even extend underneath the hinge axis.

In all the described embodiments complicated adjustments can be dispensed with. The only step that may possibly be taken is to insert a particular weight 23 in order to change the reading range of the instrument.

The above-described pressure gauges have advantage over a gauge such as that described in British patent specification No. 1,193,600 in the direction of reducing the outlay involved in manufacture and assembly, as well as the size of the instrument while ensuring high reading accuracy and a wide measuring range. The need for adjustment is eliminated, so far as possible, or at least reduced to the adjustment of a single parameter.

What is claimed is:

1. A pressure gauge for indicating small pressure changes comprising a sac of thin flexible film material communicable with and inflatable by the pressure to be indicated, during use; a base for supporting the sac wherein the sac effectively inflates generally outwardly therefrom, during use; a transmission plate; means pivotally mounting the transmission plate to rest freely against the sac, comprising a hinge connecting the transmission plate to the base for free swinging movement of the transmission plate in response to the inflation and deflation of the sac; and a pointer directly connected to the transmission plate to indicate the position thereof under the influence of pressure to the sac to effect the indication of that pressure.

2. A pressure gauge as claimed in claim 1, wherein the means mounting the transmission plate mounts same to rest freely on the sac solely under the influence of gravity.

3. A pressure gauge as claimed in claim 1, wherein the sac comprises two superposed rectangular pieces of film seamed at their peripheral edges.

4. A pressure gauge as claimed in claim 3, wherein the uninflated area of the sac is greater than the area of the transmission plate bearing against the sac.

5. A pressure gauge as claimed in claim 1, wherein the pointer is an integral extension of the transmission plate.

6. A pressure gauge as claimed in claim 1, further including a weight to augment the weight of the transmission plate to adjust the range of the pressure to be indicated.

7. A pressure gauge as claimed in claim 1, wherein the transmission plate swings up and down equally about a horizontal plane of symmetry.

8. A pressure gauge as claimed in claim 1, wherein the hinge comprises a plate attached to the base having a slot therein and an extending portion of the transmission plate having lugs thereon and which passes through the slot and is retained therein by the lugs.

9. A pressure gauge as claimed in claim 1, wherein the surface of the base on which the sac is supported is, during use, inclined to the horizontal at an angle substantially equal to half the angular deflection range of the pointer and transmission plate.

10. A pressure gauge as claimed in claim 1, further including a cylindrically curved vertical edgeview projecting dial having a division line scale thereon, a central axis substantially coincident with the axis of the hinge and a slot at one side of the dial and, wherein the pointer has an indicating portion and extends from the side of the transmission plate remote from the hinge through the slot at one side of the dial and the indicating portion of the pointer extends across the dial parallel to the division lines of the scale.

11. A pressure gauge as claimed in claim 1, further including an arcuate sector type dial which extends equally on either side of a horizontal plane of symmetry including the axis of the hinge and wherein the pointer extends over the dial from the side of the transmission plate remote from the hinge.

12. A pressure gauge as claimed in claim 1, further including an arcuate sector type dial which extends equally on either side of a vertical plane of symmetry including the axis of the hinge and wherein the pointer extends over the dial from a point on the transmission plate near to the hinge and being off-angled at a point intermediate its ends.

13. A pressure gauge as claimed in claim 1, wherein the transmission plate is convex towards the sac.

14. A pressure gauge as claimed in claim 1, wherein the surface of the base supporting the sac is convex towards the sac.

15. A pressure gauge as claimed in claim 1, wherein the transmission plate and the surface of the base are cylindrically curved with respective central axes parallel with the axis of the hinge.

16. A pressure gauge according to claim 1, wherein the sac inflates from a deflated flat cross section to an inflated arcuate cross section to decrease the area of contact with the transmission plate.

* * * * *